United States Patent [19]

Sommerfeldt et al.

[11] Patent Number: 5,165,542

[45] Date of Patent: * Nov. 24, 1992

[54] REUSABLE CONTAINER FOR TAPE PANCAKES

[75] Inventors: Frank A. Sommerfeldt, New Richmond, Wis.; Gerald J. Niles, St. Paul, Minn.; Forrest A. Johnsen, Ellsworth, Wis.; Davis W. Chamberlin, St. Paul, Minn.

[73] Assignee: Minnesota Mining and Manufacturing Company, St. Paul, Minn.

[*] Notice: The portion of the term of this patent subsequent to Mar. 10, 2009 has been disclaimed.

[21] Appl. No.: 800,590

[22] Filed: Nov. 27, 1991

Related U.S. Application Data

[63] Continuation-in-part of Ser. No. 696,520, May 7, 1991, Pat. No. 5,094,346.

[51] Int. Cl.$^5$ .............................................. B65D 85/67
[52] U.S. Cl. .................................. 206/394; 242/72 R
[58] Field of Search .............. 242/72 R; 206/391, 394, 206/444, 403, 407, 598, 600, 303, 386

[56] References Cited

U.S. PATENT DOCUMENTS

| | | | |
|---|---|---|---|
| 4,069,914 | 1/1978 | Damsky | 206/303 |
| 4,124,173 | 11/1978 | Damour | 242/72 B |
| 4,491,222 | 1/1985 | Gacetta et al. | 206/394 |
| 4,516,786 | 5/1985 | Lund | 279/2 R |
| 4,708,246 | 11/1987 | Minion | 206/394 |
| 4,730,779 | 3/1988 | Thievessen | 242/72 R |
| 4,792,044 | 12/1988 | Nishizawa et al. | 206/394 |
| 4,883,178 | 11/1989 | Thiele et al. | 206/391 |
| 4,893,765 | 1/1990 | Randolph | 242/72 R |
| 4,955,471 | 9/1990 | Hirose et al. | 206/303 |
| 5,094,346 | 3/1992 | Sommerfeldt et al. | 206/394 |

*Primary Examiner*—William I. Price
*Attorney, Agent, or Firm*—Gary L. Griswold; Walter N. Kirn; Charles D. Levine

[57] ABSTRACT

A container for pancakes of recording tape has an L-shaped base, mandrels extending horizontally from the base on which pancakes are placed, and a cover which encloses the pancakes. A compression ring provides a compression load to hold the pancakes together. The compression ring is placed around and rotated onto the outside of the mandrel. The compression ring includes an inner ring and an outer ring which engage each other. The outer ring is rotated relative the inner ring to apply the pressure on the pancake cores. Alternatively, the compression load is applied by a callapsible, one-piece unit. Two retractable wings are mounted on the free end of the mandrel and extend to engage the pancake cores. Rotation of a shaft forces the wings toward the pancakes to apply the compression load.

21 Claims, 9 Drawing Sheets

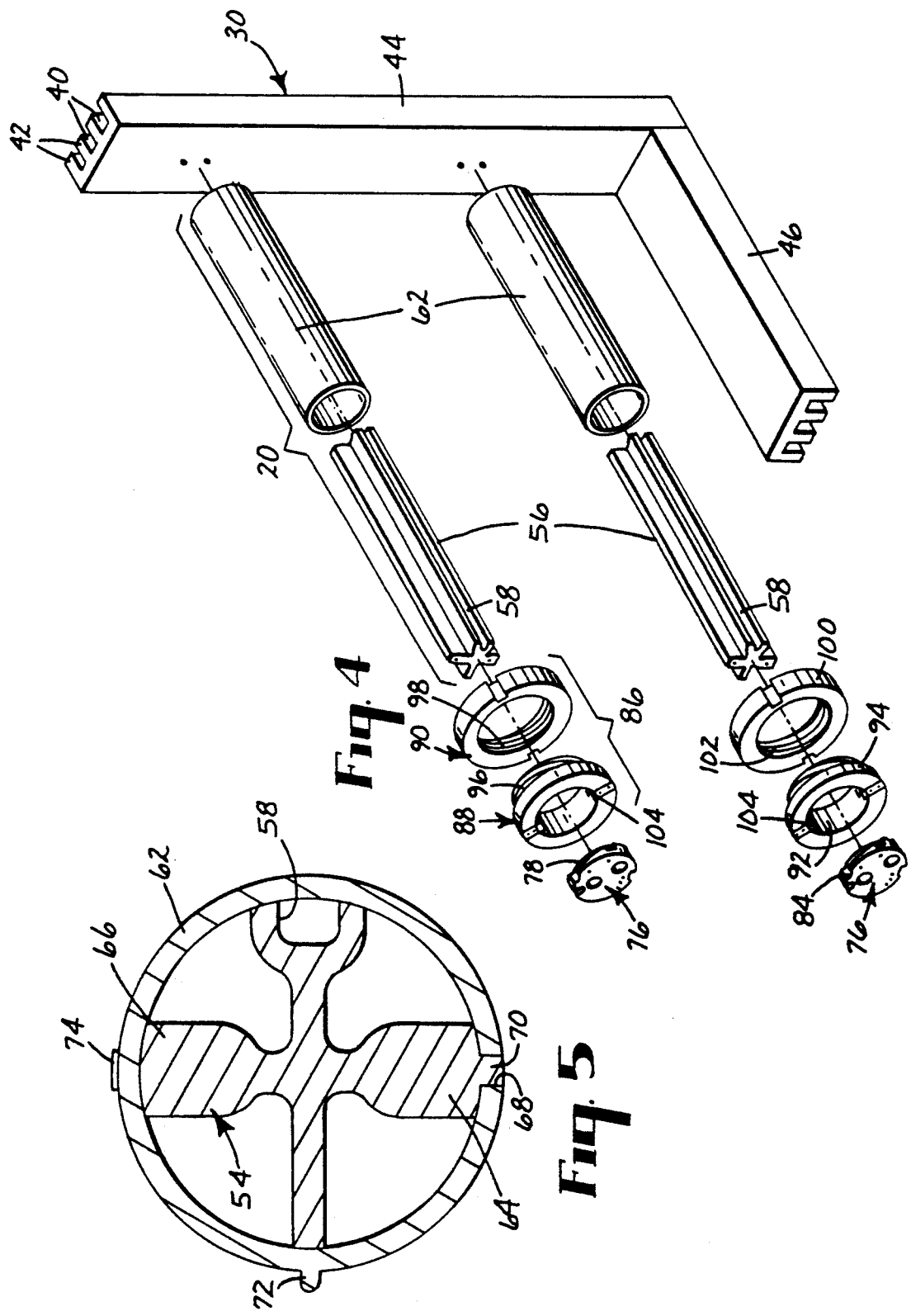

REUSABLE CONTAINER FOR TAPE PANCAKES

CROSS-REFERENCE TO RELATED APPLICATIONS

This application is a continuation-in-part of U.S. patent Ser. No. 07/696,520, filed on May 7, 1991, now U.S. Pat. No. 5,094,346 and entitled "Reusable Container For Tape Pancakes."

TECHNICAL FIELD

The present invention relates to shipping containers for tape pancakes. More particularly, the present invention relates to reusable, returnable, ergonomic shipping containers for magnetic tape pancakes.

BACKGROUND OF THE INVENTION

In producing magnetic recording media, there is a recurring need to transport large quantities of recording tape from the point of tape manufacture to other locations for final loading into cassettes, cartridges, or other carriers. It is common to transport the tape in the form of relatively large rolls, called "pancakes." A pancake of 1.27 cm (0.5 in) wide tape is typically wound on a hollow annular core having an outer diameter of 11.4 cm (4.5 in), and a width of 1.8 cm (0.7 in), slightly larger than the width of the tape. The outer diameter of the pancakes is typically about 35.6–40.7 cm (14–16 in). Shipping these tape pancakes over long distances under conditions of mechanical shock and vibration requires that they be well supported.

One primary form of damage to pancakes is axial shifting of the layers of tape relative to the pancake such that the pancake is no longer flat. This shifting, called "core drop" or "hub drop," is measured by laying the pancake on a flat surface and measuring the height of the tape portion of the pancake at the inner and outer radii. Measurements are made both before and after subjecting the pancake to shock or vibration. Core drop during shipping is typically caused by a stack of pancakes being dropped on a hard floor or being transported over rough or bumpy surfaces. Other problems and damage caused with known pancake containers include the offsetting of a portion of the pancake, called "upset," rotation of the core relative to the pancake, and transfer of cushion adhesive to the tape.

While effective protection of the tape in the pancake stacks is essential, the magnetic tape market is very price-competitive. Therefore, protective packaging must be low cost, both in the packaging material itself, and in the labor required to apply and remove the packaging. It is also desirable to minimize the amount of packaging waste material which must be discarded.

Known methods of protecting pancakes during shipping generally involve sliding several pancakes over a shaft or hollow tube, placing resilient spacers between each pancake, and disposing a solid end plate on the top and bottom of the stack. The stack can be held together by shrink wrap film, as disclosed in U.S. Pat. No. 4,955,471. However, the application and removal of shrink wrap film is very labor-intensive. Removal can involve cutting or other operations which can damage the pancake and generate waste which can contaminate the tape. Also, shrink wrap is not reusable, thereby increasing costs.

The shrink wrap removal problem is addressed in U.S. Pat. No. 4,708,246, assigned to Minnesota Mining and Manufacturing Company. This patent discloses grooves in the outer surface of the package to allow a knife to cut the shrink wrap without contacting the inner packaging material. This is accomplished by running the knife along the groove, without penetrating beyond the depth of the groove as the shrink wrap is cut.

U.S Pat. No. 4,883,178 eliminates shrink wrap. This patent discloses holding the stack together with a threaded member running coaxially along the center of the stack, and a nut which tightens on an endplate. The compression is created by the threaded member being disposed within the pancake cores. This method is less labor intensive than shrink wrap, but it does not enclose the stack, so that additional wrapping may still be required.

Whenever axial compression is used to hold the pancakes together, the compression itself may damage the pancakes or their cores. U.S. Pat. No. 4,708,246 discloses spacers and other packaging features which improve compression control. However, sometimes spacers move during shipping and can generate debris. Also, some spacer materials can create static which attracts debris to the pancakes.

Radially expanding mandrels are also known. U.S. Pat. No. 4,124,173 discloses an inflatable tube inside of an expandable mandrel. Cam mechanisms which press cylinder segments outwardly when a central shaft rotates relative to the outer segments are also known. U.S. Pat. No. 4,516,786 discloses a rotatable core chuck and U.S. Pat. No. 4,730,779 discloses an expanding assembly for a web-coiling core. These cores are used in rotating apparatus and must be heavy and complex to accommodate the dynamics of rotating environments.

In the majority of cases, the pancake is placed on an unwind apparatus to feed the tape into a cassette or cartridge loading machine. The pancake is loaded onto the machine with the core axis horizontal. Since a typical pancake can weigh over 7.8N (4 lb), the effort required to remove pancakes from their package and place them on the unwind apparatus is significant. Additionally, most known pancake packaging stacks the pancakes vertically. This requires the extra step of either tipping the entire stack or individual pancakes to a position with a horizontal axis before loading the pancakes onto the loading machine. Due to the weight of the pancakes and the repetitive nature of this task in production, worker fatigue and injury can be significant problems. It is desirable that the packaging be ergonomically designed to reduce the effort required to load the pancakes onto the loading machine without risking tape damage, or injury to the workers.

SUMMARY OF THE INVENTION

The ergonomic and reusable container for pancakes of the present invention overcomes the disadvantages of the known containers and shipping devices. The pancakes are stacked horizontally to eliminate the need to rotate the pancakes before use. The container eliminates use of shrink wrap and other non-reusable wrapping materials, as well as an extraneous materials which can generate additional debris. Additionally, the container is simple and lightweight. The container includes a base, at least one mandrel extending from the base on which pancakes can be placed, and a cover which encloses the pancakes.

Preferably, the base is L-shaped and the mandrels extend from the vertical portion of the L. The base includes an L-shaped frame and an L-shaped enclosure which receives the L-shaped frame in a cavity. The cover has an internal space shaped to approximate the shape and size of a plurality of pancakes.

Each mandrel includes a mandrel frame and a mandrel cover. In one embodiment, an end cap is disposed on the free end of the mandrel. The end cap has an outer edge and two ramped slots formed on the its outer edge, a pair of opposed first detents, and a pair of opposed second detents. Each ramped slot begins from the pair of first detents and ends in the pair of second detents.

A compression ring is placed on the end cap to provide axial compression load on the pancake cores. The compression ring is placed on and rotated onto the outside of the mandrel. Preferably the compression ring is pressed against substantially only the cores of the pancakes. The compression ring is a two part assembly including an inner ring and an outer ring. The inner ring has an inner surface, an outer surface, and external threads on the outer surface. The outer ring has an inner surface, an outer surface, and internal threads on the inner surface which mate with the internal threads on the outer ring to facilitate relative rotation between the two rings. A pair of tabs are spaced 180° apart on the inner ring inner surface and are received within the first detents in the end cap when the compression ring is placed on the mandrel. The tabs slide within the ramped slot when the compression ring is rotated onto the mandrel, and are received within the second detents in the end cap to secure the compression ring in position on the mandrel. After the compression ring is in position on the mandrel, the outer ring is rotated relative the inner ring to apply the pressure on the pancake cores.

In an alternative embodiment, the compression load is applied by a collapsible, one-piece unit. Two wings are mounted on the free end of the mandrel and are movable between a retracted position in which the wings are within the outer diameter of the mandrel and permit pancakes to slide onto the mandrel and an extended position in which the wings extend beyond the outer diameter of the mandrel to engage the pancake cores. In one version, an end plate is mounted on the end of the mandrel adjacent the wings and a shaft passes through the end plate and into the mandrel, such that rotation of the shaft toward the mandrel forces the end plate and the wings toward the pancakes to apply the compression load.

In another version, a shaft has a threaded larger diameter portion on which the wing assembly is received and a threaded smaller diameter portion which engages the end of the mandrel. The wing assembly includes two wings, a top plate and a base surrounding the wings, and a lock screw which is threaded into one of the wings. When the wings are retracted, the pancakes can be mounted onto the mandrel. After the pancakes are mounted on the mandrel, the wings are extended and the threaded shaft is screwed toward the mandrel so that the larger diameter portion abuts the mandrel. The wing assembly is then rotated onto the threaded shaft to move the wing assembly toward the pancakes while the threaded shaft remains stationary. Then the lock screw is threaded through the wing to engage the core opening. Because the wing assembly is held adjacent the core due to the engagement of the lock screw in the core, the wing assembly does not move out with the threaded shaft when the shaft is rotated away from the mandrel. The movement of the threaded shaft away from the mandrel decreases the distance between the wings of the wing assembly and the mandrel.

BRIEF DESCRIPTION OF THE DRAWINGS

FIG. 4 is an exploded perspective view of the frame and mandrels of the base of FIG. 2 showing the compression ring according to one embodiment of the present invention.

FIG. 5 is a cross-sectional view of the mandrel taken along line 5—5 of FIG. 1.

DETAILED DESCRIPTION OF PREFERRED EMBODIMENTS

Figure 1:
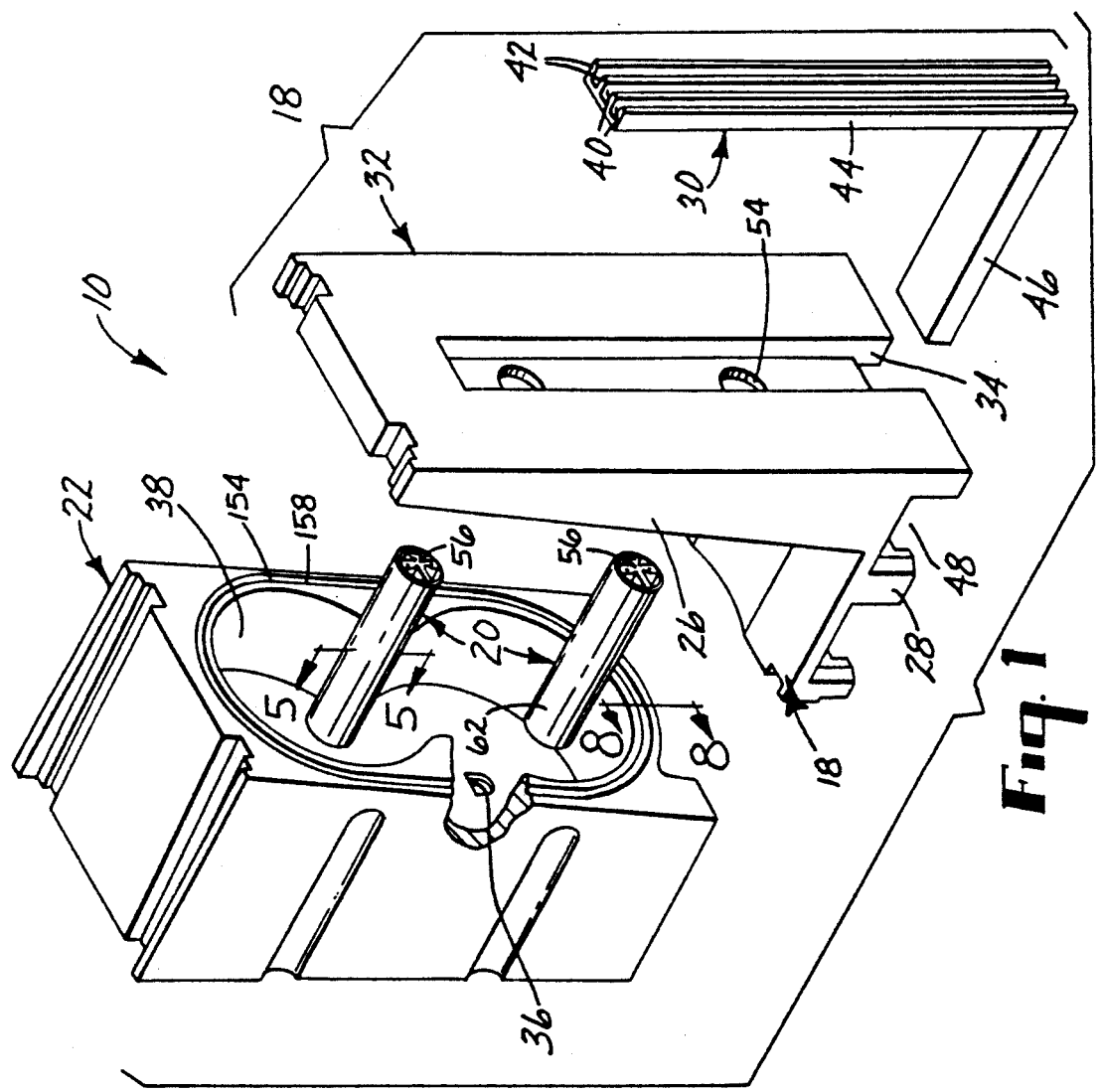
FIG. 1 is an exploded view of a container according to the present invention.

FIG. 1 illustrates the container 10 of the present invention. The container 10 is used for pancakes 12 of recording tape, each of which includes a quantity of tape 14 wound around a flangeless hub or core 16 which extends approximately 0.25 cm (0.1 in) on each side of the tape 14. The container 10 includes a base 18, at least one mandrel 20 extending from the base 18 on which a plurality of pancakes 12 can be placed, and a cover 22 which combines with the base 18 to completely enclose the pancakes 12.

Figure 2:
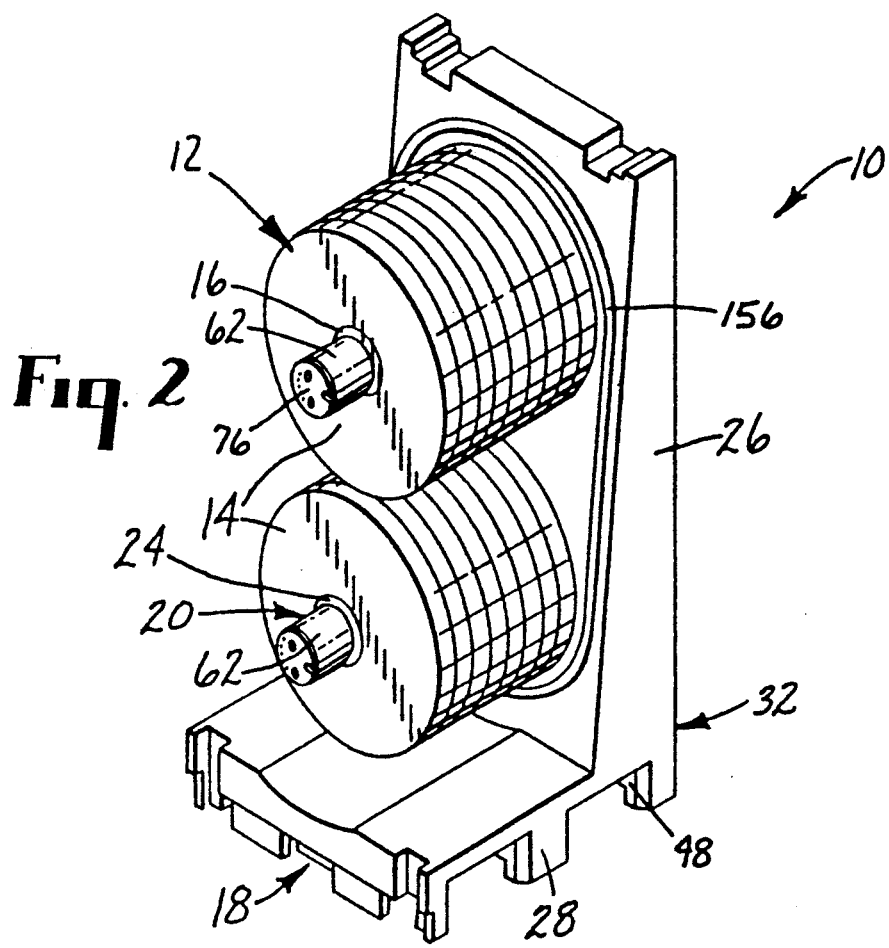
FIG. 2 is a perspective view of the base of the container of FIG. 1.

A thin spacer 24, shown in FIG. 2 with an adjacent pancake 12 removed, can be disposed between adjacent pancakes 12 on each mandrel 20 to prevent the adjacent cores from contacting each other and thereby to prevent "hub dusting" which creates debris. Preferably, the spacers 24 are made of paper, foam, or elastomeric material, which does not induce static charges. An end pad or bushing (not shown) can be placed on at least the wall of the base 18 to further protect the pancakes 12 by spacing the pancakes 12 from the wall, maintaining constant axial pressure on the pancakes 12, and preventing damage to the adjacent pancake due to contact with the base wall if the wall bows and contacts the pancake 12 nonuniformly. The peripheral edges of the pancakes 12 are completely exposed to allow them to be grasped symmetrically to reduce the effort needed to remove the pancakes 12 from the mandrel 20. This reduces the risk of damage to the pancakes 12 and injury to workers.

Preferably, the mandrels 20 are positioned horizontally and slightly upwardly, as shown in FIGS. 1 and 2. This stacks the pancakes 12 horizontally. Since cassette loading machines, which use magnetic tape in pancake form, require the pancakes 12 to be oriented with a horizontal axis, the horizontal mandrels 20 eliminate the need to rotate the pancakes 12.

In the preferred embodiment, the base 18 is L-shaped having a vertical portion 26 and a horizontal portion 28. The mandrels 20 extend from the vertical portion 26 of the L. The base 18 includes an L-shaped frame 30 and an L-shaped enclosure 32. The enclosure 32 has a cavity 34 which receives the frame 30. The frame 30 is secured to the enclosure 32 in the cavity 34 by bolts or other fastening devices. The cover 22 optionally includes recesses 36 for receiving and supporting the free ends of the mandrels 20. The cover 22 has an internal space 38 shaped to approximate the shape and size of the pancakes 12. This minimizes the volume of space around the pancakes 12 and increases the rigidity of the cover 22.

Figure 3:
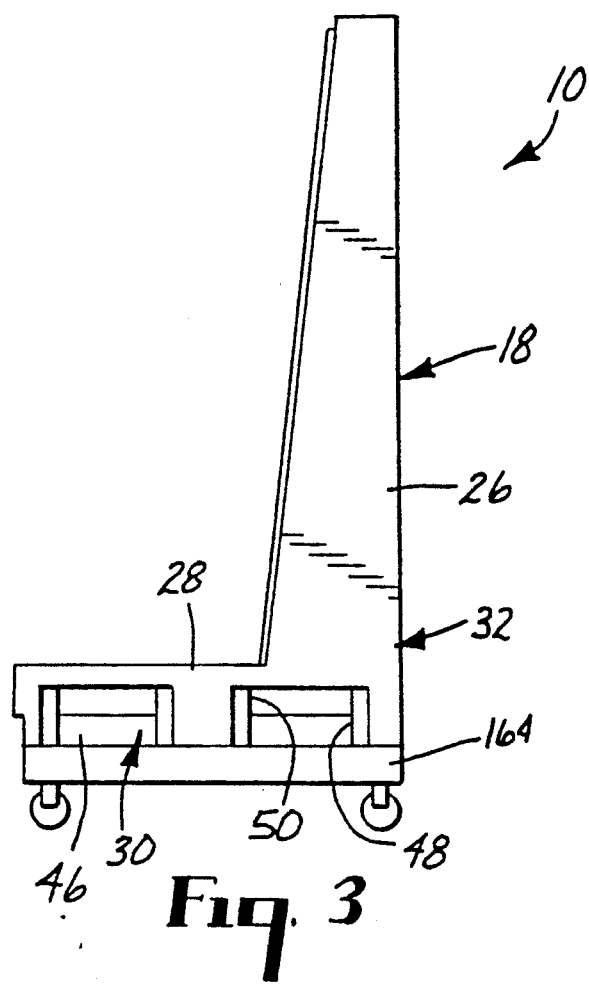
FIG. 3 is a side view of the base of FIG. 2.

The L-shaped frame 30 is formed of multiple channels 40, formed of straight sections 42 as shown in FIG. 1, which support the weight of the mandrels 20 and the pancakes 12. The frame 30 can be formed by extruding a vertical portion 44 and a horizontal portion 46 and welding them together at substantially right angles. The frame 30 is made of metal having a high strength-to-weight ratio, such as aluminum, and is designed to flex. To accommodate flexing, the angle between the vertical and horizontal portions 44, 46 of the frame 30, and between the vertical and horizontal portions 26, 28 of the base 18, can be obtuse. An obtuse angle, as best shown in FIG. 3, also improves the strength-to-weight ratio of the enclosure 32 and the cover 22, which can be made from high density polyethylene by rotational molding to create strong, lightweight, hollow shells. Additionally, the enclosure 32 and cover 22 can be filled with an insulating foam such as urethane to maintain a constant temperature within the container 10 and prevent core drop which can result from temperature changes.

Notches 48 are formed in the bottom of the enclosure 32 perpendicular to the horizontal portion 46 of the L-shaped frame 30. The notches 48 have a height greater than that of the horizontal portion 46 of the frame 30 to form channels 50 defined at the top by the top of the notch 48 and at the bottom, at least in part, by the top of the horizontal portion 46 of the frame 30, as shown in FIG. 3. The channels 50 extend across the horizontal portion 46 of the frame 30 and can receive the tines of fork lifts and similar devices. The containers 10 will not tip when lifted because the tines are located above the horizontal portion 46 of the frame 30.

Figure 11:
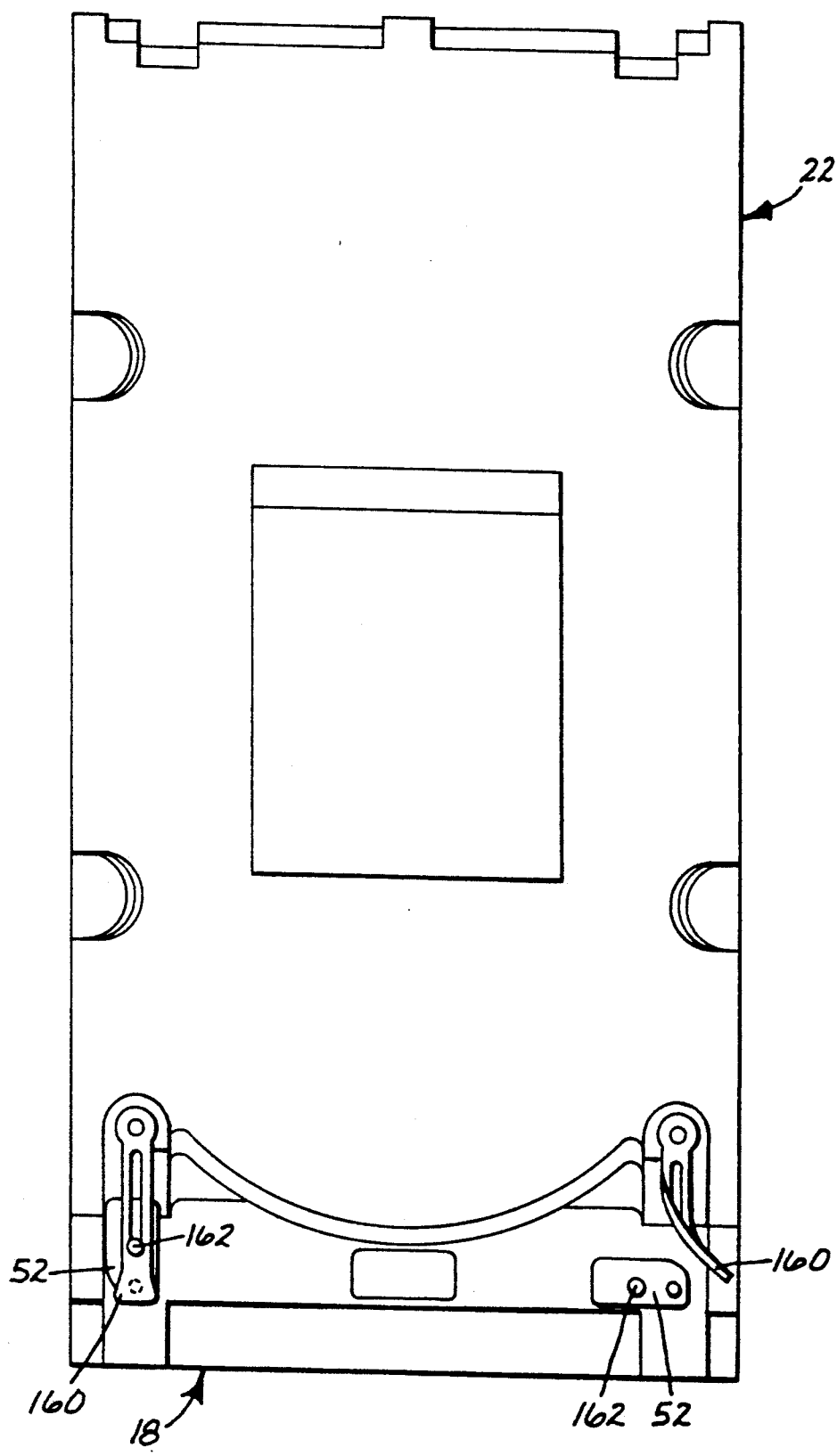
FIG. 11 is a front view of the container with the cover in position to close the container.
Figure 12:
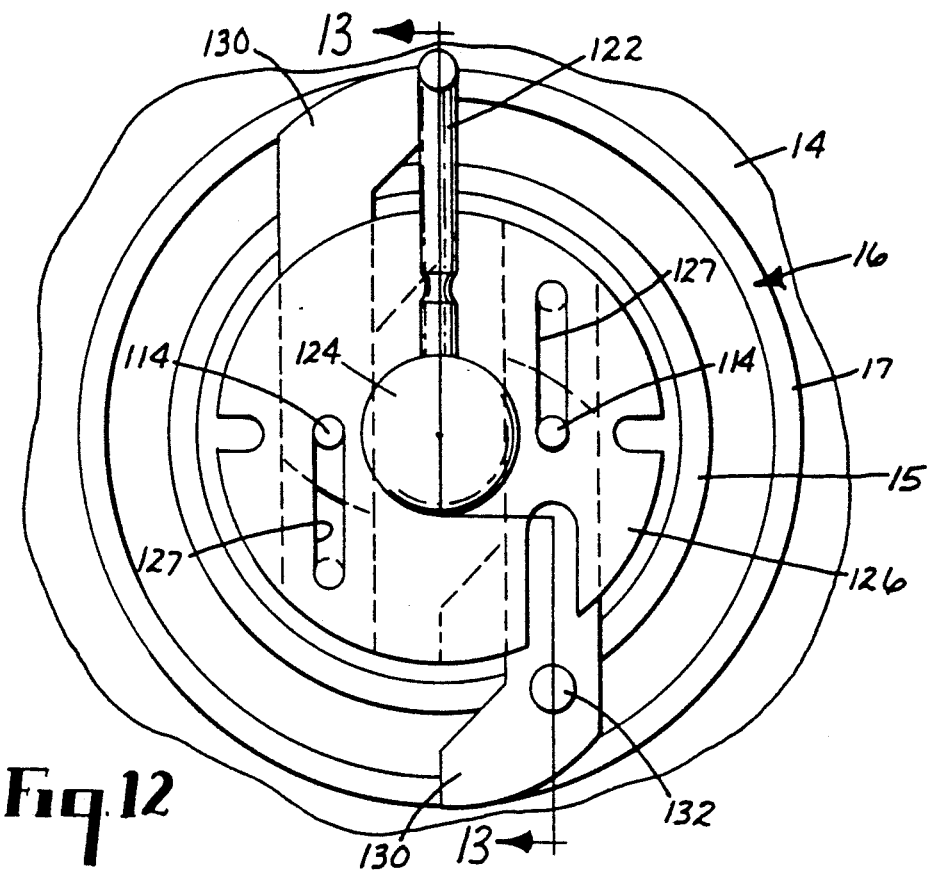
FIG. 12 is an end view of a mandrel with a compression-applying system according to another embodiment of the present invention.

Pivotable cover catches 52 are located on the horizontal portion 46 of the L-shaped frame 30. These catches 52 are shown in FIG. 11 which is a front view of a modified container 10 according to a modification of the present invention. These catches 52 prevent the cover 22 from sliding off of the frame 30 due to vibrations. The catches 52 pivot out of the way and below the upper surface of the horizontal portion 46 of the L-shaped frame 30 to remove the cover 22. The left catch 52 is shown in position to retain the cover and the right catch 52 is shown in position to permit the cover to be removed.

The mandrels 20 pass through holes 54 in the enclosure 32 and into the L-shaped frame 30 of the base 18. The mandrels 20 can be attached to the vertical portion 44 of the frame 30 by bolts or other fastening devices. As shown in FIGS. 4 and 5, each mandrel 20 includes a cross-shaped mandrel frame 56 secured to the vertical portion 44 of the L-shaped frame 30. The mandrel frame 56 has a longitudinal slot 58 formed in one of the side arms 60. A flexible mandrel cover 62 is slid over the mandrel frame 54. The mandrel frame 56 also includes a lower arm 64 and an upper arm 66. The mandrel cover 62 has a slit 68 which receives a tab 70 formed in the lower arm 64 of the mandrel frame 54 as shown in FIG. 5. Preferably, the mandrel cover 62 includes a longitudinal key 72 which is received in keyways (not shown) on the inner surface of the pancake core 16 to prevent the pancakes 12 from rotating. Optionally, deformable longitudinal strips 74 can be formed along the length of the mandrel cover 62 to engage the cores 16, take up slack, and serve as shock absorbers. Preferably, these strips would be located at locations where the mandrel 20 contacts the pancake cores 16.

The mandrel frame 54 is made of extruded aluminum or other material having a suitable strength-to-weight ratio. The mandrel cover 62 can be made from any strong, lightweight material such as high density polyethylene or polypropylene with high lubricity to enable easy loading of the pancakes 12.

An end cap 76, shown in FIGS. 4, 6, 7, 9, and 10, is fixed on the free end of the mandrel frame 54. The end cap 76 prevents the mandrel cover 62 from sliding off of the mandrel frame 54. The end cap 76 includes two ramped slots 78 formed on its outer edge 80. The ramped slots 78 acts like a thread and each begins from a respective one of a pair of opposed first detents 82 spaced 180° apart and ends in a respective one of a pair of opposed second detents 84, spaced 180° apart. Alternatively, a single, first detent 82, ramped slot 78, and second detent 84 can be used.

Figure 7:
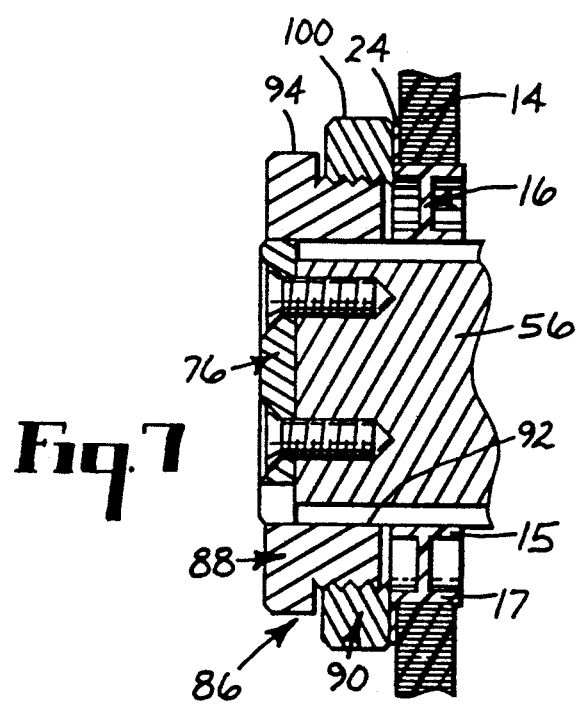
FIG. 7 is an end view of the compression ring of FIG. 4 mounted on a mandrel.
Figure 6:
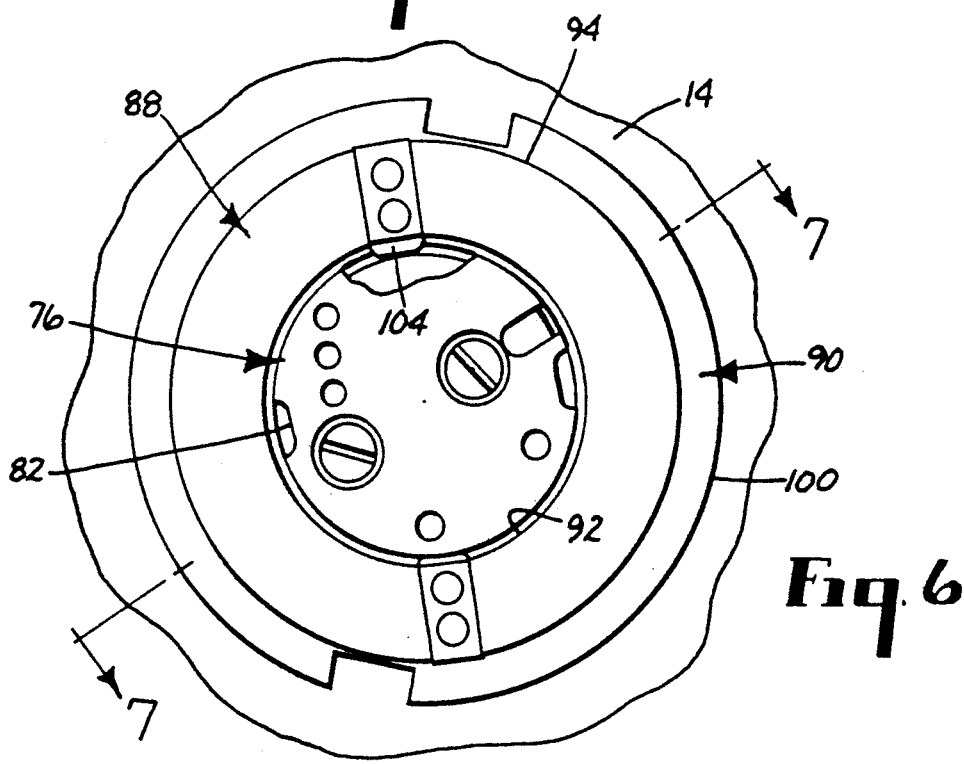
FIG. 6 is a cross-sectional view of the compression ring taken along line 6—6 of FIG. 7.

An axial compression load is applied on the cores 16 of the pancakes 12 to hold together the pancakes 12. As shown in FIGS. 4, 6, and 7, a cylindrical compression ring 86 is placed on the end cap 76 and compresses the pancakes 12 on the mandrel 20 by applying a load on substantially only the pancake cores 16. By eliminating pressure on the tape 14 itself, there is no pressure on the tape to force the tape off of the core 16 and cause core drop. Preferably, the load is applied to substantially only the outer race 17 of the cores 16 to avoid tipping the pancake 12 on the mandrel 20 due to the lack of contact surface area caused by the clearance between the pancake core 16 and the mandrel 20. This can be accomplished by forming the inner race 15 of the core 16 of a smaller axial length than the outer race 17. Alternatively, this can be accomplished by forming the portion of the compression ring 86 that is disposed adjacent the inner race 15 of the core 16 of a smaller axial length than the radially outer portions of the compression ring 86 disposed adjacent and against the outer race 17 of the core 16.

The compression ring 86 is a two part assembly which engages the mandrel 20 by being disposed over and outside of the mandrel, as opposed to known compression devices which are inserted into or through the mandrel. The compression ring 86 includes an inner ring 88 and an outer ring 90. The inner ring 88 has a cylindrical inner surface 92 and a cylindrical outer surface 94. External threads 96 are formed on the outer surface 94. The outer ring 90 has a cylindrical inner surface 98 and a cylindrical outer surface 100 and internal threads 102 are formed on the inner surface 98 which mate with the external threads 96 on the inner ring 88 to facilitate relative rotation between the two rings. The inner ring 88 also includes a pair of tabs 104 spaced 180° apart on its inner surface 92. The tabs 104 are received within the first detents 82 in the end cap 76 of the mandrel 20 when the compression ring 86 is placed on the mandrel 20. The tabs 104 slide within the ramped slots 78 of the end cap 76 when the compression ring 86 is rotated onto the mandrel 20, and the tabs 104 are received within the second detents 84 in the end cap 76 to secure the compression ring 86 in position on the mandrel 20.

After the compression ring 86 is mounted on the mandrel 20 and the tabs 104 are received within the second detents 84 in the end cap 76, the outer ring 90 is rotated relative the inner ring 88 to apply the pressure on the pancake cores 16.

This system for applying a compression load on pancakes stored on a mandrel, and the modifications that follow, can be used in other systems in which one or more objects having a through opening are stored on a mandrel or spindle and the objects are held in place using axial compression. Neither the objects nor the mandrel need be cylindrical.

Alternative embodiments of the mandrel and compression ring are shown in FIGS. 12-18. In these configurations, all of the components are contained in a collapsible, integral, one-piece unit with no components being separated from the others during use. In the embodiment of FIGS. 12, 13, 14, 15, and 16, the mandrel cover 62 extends beyond the end of the mandrel frame 56. A wing assembly 106 is threaded onto a threaded shaft 108. The threaded shaft 108 includes a threaded larger diameter portion 110 on which the wing assembly 106 is threaded and a threaded smaller diameter portion 112 which threads into a support plate 116 which is fixed to the end of the mandrel 20 through bolts 118. The larger diameter portion 110 and the smaller diameter portion 112 have with different threaded leads. The larger diameter portion 110 has fewer threads per inch and therefore moves axially further in a single threaded shaft 108 rotation than the smaller diameter portion 112. A retaining ring is mounted around each portion 110, 112 of the shaft 108. A stop screw 120 is threaded into the support plate 116. A rotating bar 122 is mounted through the head 124 of the shaft 108 to facilitate rotation of the shaft as explained below. The rotating bar 122 includes two detents which hold the bar in one of two positions on the shaft 108.

Figure 15:
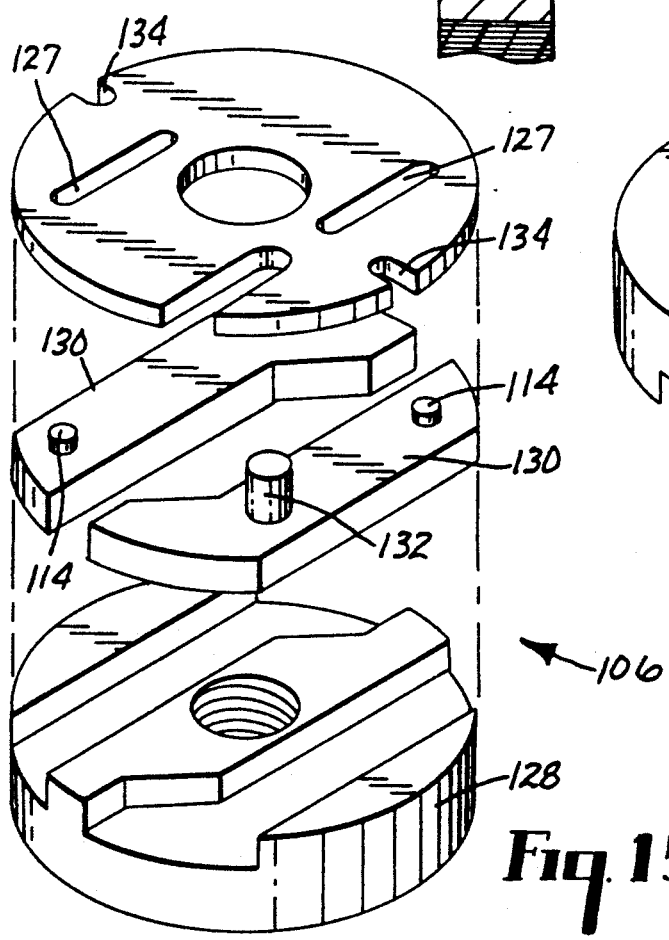
FIG. 15 is an exploded perspective view of the wing assembly of the compression-applying system of FIG. 12.
Figure 16:
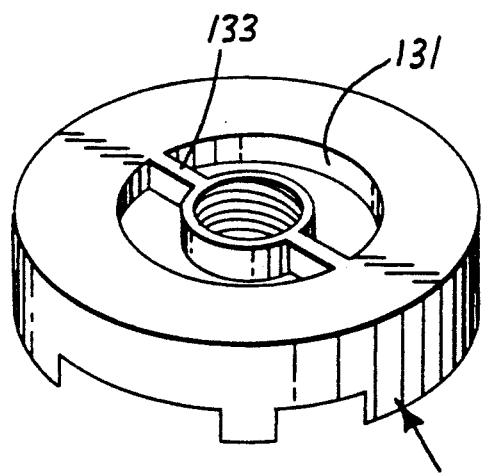
FIG. 16 is a perspective bottom view of the surface of the base of the wing assembly of FIG. 15.

The wing assembly 106 includes a top plate 126 mounted on a base 128, two wings 130, and a lock screw 132, as shown in FIG. 15. The wing assembly 106 can be held together in any conventional manner such as threaded bolts (not shown). The wings 130 are free to slide between the base 128 and the top plate 126. The wings 130 slide between a retracted position shown in broken line in FIG. 12 and an extended position shown in solid line in FIG. 12. The wings 130 include posts 114 which slide within a slot 127 in the top plate 126. The posts 114 are used to move the wings 130 between the retracted and extended positions. Any friction creating device, such as detents on the back of the wings which can receive a projection on the base 128 or biasing devices, can be used to prevent the wings from sliding randomly. In the retracted position the wings 130 are completely within the outer diameter of the mandrel 20 and permit pancakes 12 to slide onto the mandrel 20. In the extended position the wings 130 extend beyond the outer diameter of the mandrel 20 and the outer race 17 of the core 16 and engage the pancake cores 16. The lock screw 132 is threaded into one of the wings 130 and can engage an opening in the cores 16 to prevent relative rotation between the wings 130 and the cores 16 when the compression load is applied. As best shown in FIG. 16, the surface of the base 128 opposite the wings includes two semi-annular grooves 131 bounded and separated by two webs 133 spaced 180° apart. The width of the grooves 131 is equal to or slightly larger than the width of the head of the stop screw 120.

Figure 13:
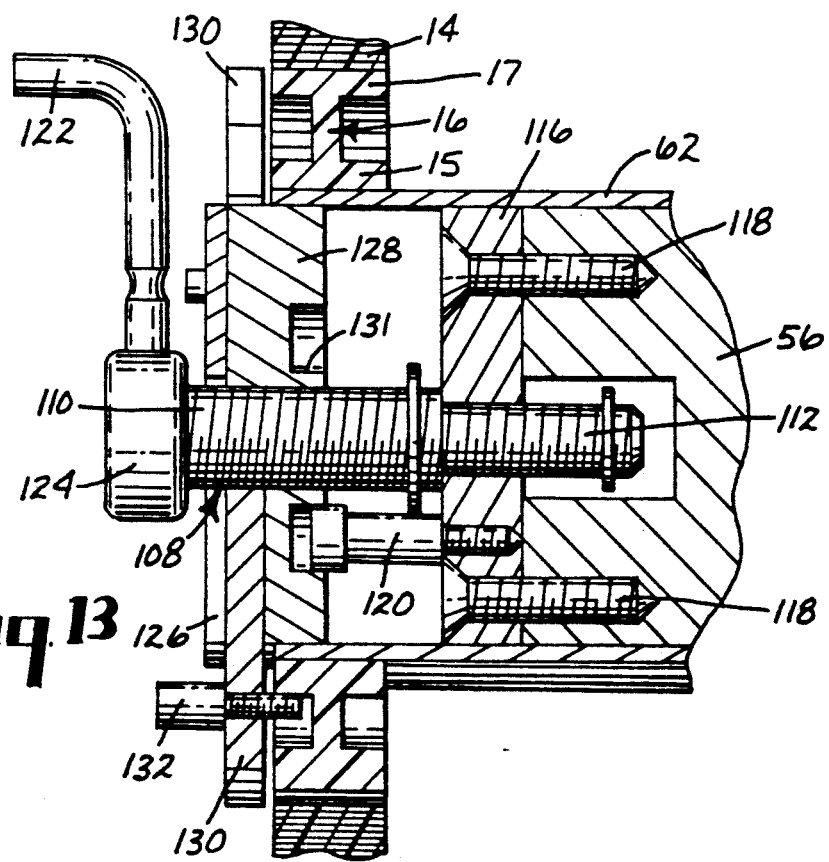
FIG. 13 is a cross-sectional view of the compression-applying system taken along line 13—13 of FIG. 12 while the compression load is being applied.
Figure 14:
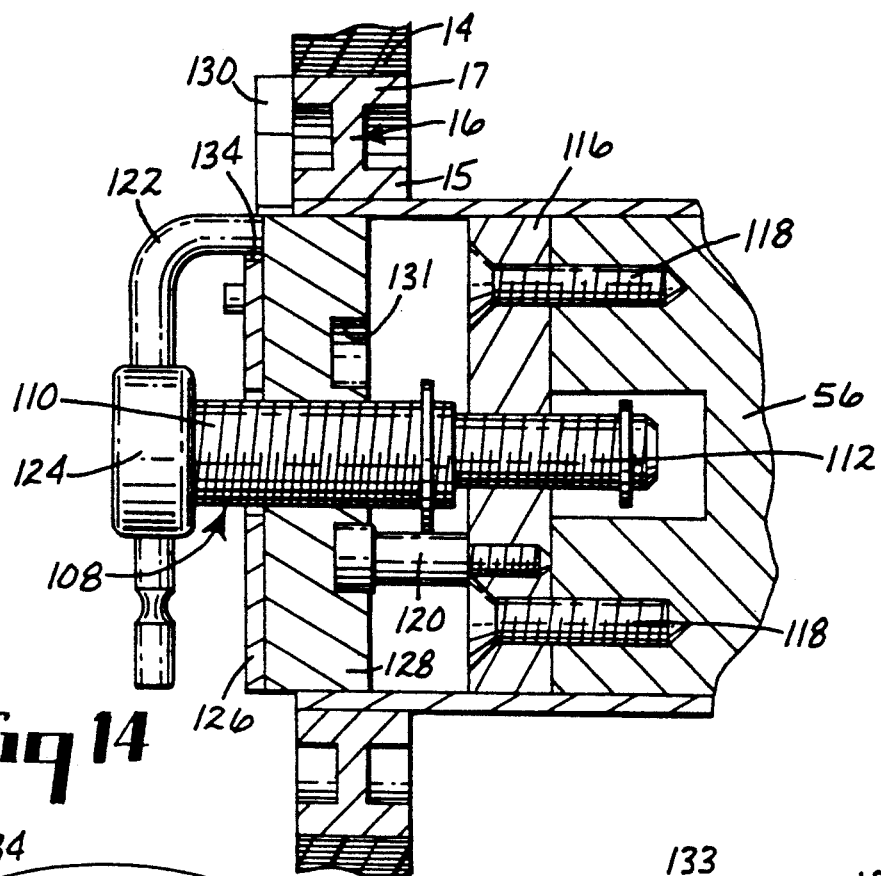
FIG. 14 is a cross-sectional view of the compression-applying system of FIG. 12 after the application of the compression load.

When the wings 130 are in the retracted position, the rotating bar 122 is in the position shown in FIG. 14, and the lock screw 132 does not engage the core 16, the pancakes 14 can be mounted onto the mandrel 20. At this time, the larger diameter portion 110 of the threaded shaft 108 does not abut the support plate 116. After the pancakes 14 are mounted on the mandrel 20, the compression load is created and applied as follows. First, the wings 130 are extended to their extended position shown in solid line in FIG. 12 and in FIGS. 13 and 14. Then the threaded shaft 108 is screwed toward the mandrel 20 so that the larger diameter portion 110 abuts the support plate 116. The wing assembly 106 is then rotated onto the threaded shaft 108 to move the wing assembly 106 toward the pancakes 16 while the threaded shaft 108 remains stationary until the wing assembly 106 contacts the stop screw 120. This stage is shown in FIG. 13. The wing assembly 106 and the stop screw 120 contact by the head of the stop screw 120 contacting the web 133 between the two grooves 131 as the grooves rotate over the stop screw 120. At this point, there is a relatively large axial distance between the top of the stop screw 120 and the bottom wall of the groove 131. The wing assembly 106 then is rotated out (toward the left in FIG. 14) as shown in FIG. 14, sufficiently to free the base 128 of the wing assembly 106 from the stop screw 120 and to allow the lock screw 132 to be aligned with the opening in the cores 16. The lock screw 132 is then threaded through the wing 130 to engage the core opening. At this point there is approximately 0.10 cm (0.040 in) clearance between the wings 130 and the core 16. Significantly more clearance would require excess rotation of the threaded shaft 108 to apply the compression load, and significantly less clearance might not be sufficient.

Next, the rotating bar 122 is moved to its position shown in FIG. 13 and the threaded shaft 108 is rotated away from the support plate 116 using the rotating bar 122 until there is adequate clamping pressure. Because the wing assembly 106 is held adjacent the core 16 due to the engagement of the lock screw 132 in the core 16, the wing assembly 106 does not move left with the threaded shaft 108. At the same time, the smaller diameter portion 112 of the threaded shaft 108 is moving out of the support plate 116 but at a lower rate and for a smaller distance per rotation than the larger diameter portion 110. Therefore, as the axial distance which the smaller diameter portion 112 moves out of and away from the support plate 116 is less than the distance the larger diameter portion 110 of the threaded shaft 108 moves with respect to the wing assembly 106, the wing assembly moves toward the support plate and the distance between the wing assembly 106 and the support plate decreases.

The rotating bar 122 then is rotated 180° and centered to engage the short end in the slot 134 in the top plate 126, as shown in FIG. 14. This prevents the threaded shaft 108 from further rotating away from the support plate 116.

These relative movements are accomplished by providing the larger diameter portion 110 and the smaller diameter portion 112 with different threaded leads. In one embodiment, the larger diameter portion has 20 threads per inch while the smaller diameter portion has 24 threads per inch. Thus, the two portions 110, 112 of the threaded shaft 108 can be used individually to provide fast movement, as when the arm assembly 106 is rotated on the larger diameter portion 110 of the threaded shaft 108. Alternatively, the two portions 110, 112 can be used together to provide fine movement with greater leverage when they act subtractively, as when the axial distance which the smaller diameter portion 112 moves out of and away from the support plate 116 is less than the distance the larger diameter portion 110 of the threaded shaft 108 moves with respect to the wing assembly 106. The distance between the wing assembly 106 and the support plate decreases by an amount equal to the difference between the distance traveled by the larger and smaller diameter portions, 110, 112.

Figure 17:
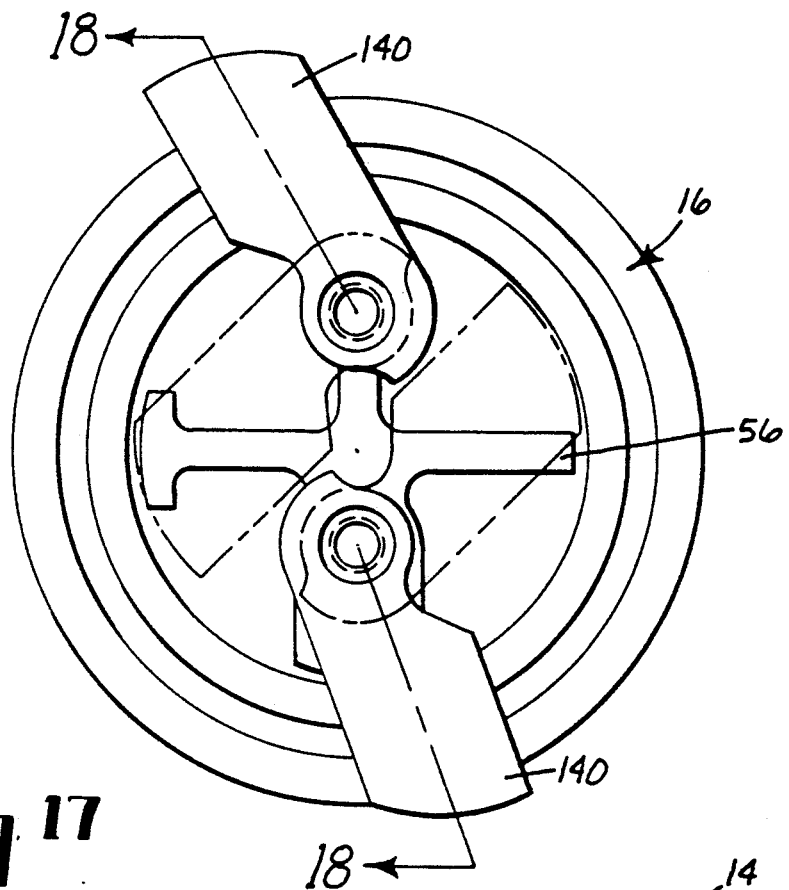
FIG. 17 is an end view of a mandrel with a compression-applying system according to another embodiment of the present invention with the compression plate and bolts removed.
Figure 18:
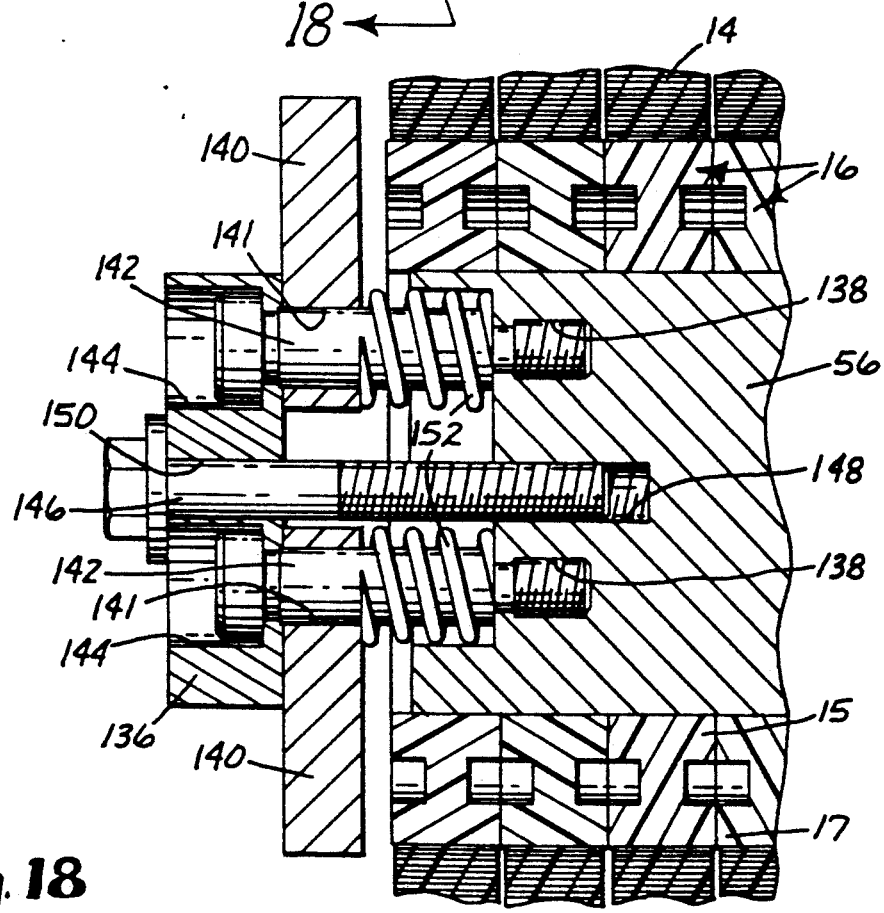
FIG. 18 is a cross-sectional view of the compression-applying system taken along line 18—18 of FIG. 17.

In the embodiment of FIGS. 17 and 18, an end cap 136 is mounted on the free end of the mandrel 20. The lower arm 64 and the upper arm 66 of the mandrel frame 56 have threaded holes 138 for fastening respective wings 140 and the end cap 136. Each wing 140 is fastened to the mandrel frame 56 by shoulder bolts 142 which pass through the threaded holes 138 in the mandrel frame 56 as well as respective bores 144 in the end cap 136 and bores 141 in the wings 140. Each wing 140 is pivotable around the shoulder bolts 142 between a retracted position shown in broken line in FIG. 17 and an extended position shown in solid line in FIG. 17. In the retracted position the wings 140 are completely within the outer diameter of the mandrel 20 and permit pancakes 12 to slide onto the mandrel 20. In the extended position the wings 140 extend beyond the outer diameter of the mandrel 20 and the outer race 17 of the cores 16 to engage the pancake cores 16.

A compression-adjusting bolt 146 is disposed in a central threaded hole 148 in the mandrel frame 56 as well as through a respective bore 150 in the end cap 136. A compression spring 152 is disposed around the shoulder bolts 142 and extends between the end of the mandrel 20 and the adjacent side of the wing 140. The compression springs 152 provide a force against the wings 140 to assist in retaining the wings 140 in either the retracted or extended positions, and alternatively can be any known biasing device mounted to maintain the wings 140 in position. Alternatively, the end cap 136 can be mounted between the wings 140 and the free end of the mandrel 20, or the wings can be mounted in recesses within the end cap 136.

When the wings 140 are in the retracted position, the pancakes 14 can be mounted onto the mandrel 20. The compression load is created by first extending the wings 140 to their extended position as shown in FIG. 18. The compression-adjusting bolt 146 is then rotated toward the mandrel frame 56 to force the wings 140 against the outer race 17 of the pancake cores 16.

Figure 8:
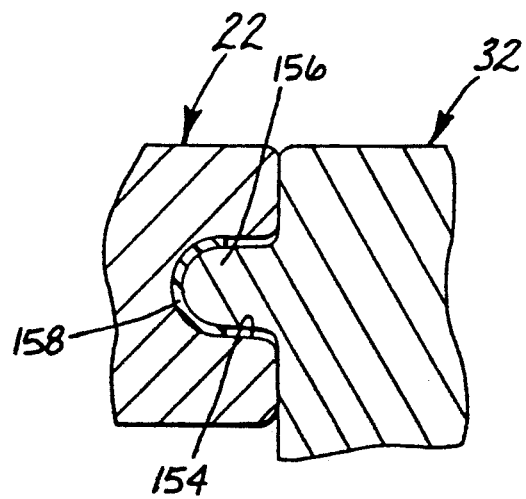
FIG. 8 is a cross-sectional view of the cover taken along line 8—8 of FIG. 1.
Figure 9:
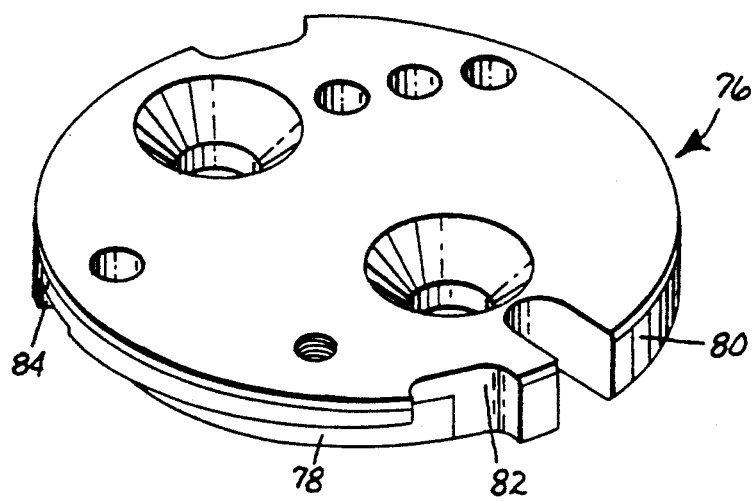
FIG. 9 is a perspective view of the end cap of the mandrel.
Figure 10:
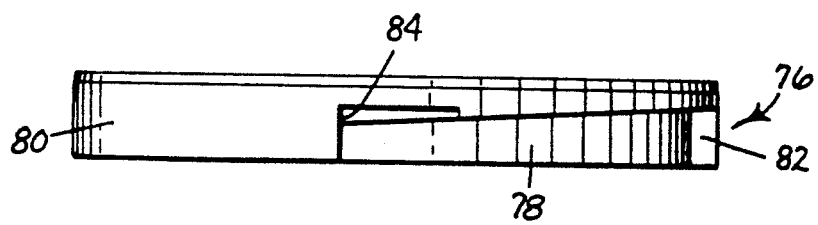
FIG. 10 is a side view of the end cap of FIG. 9.

The container cover 22 is secured onto the enclosure 32 with fasteners so that the container 10 seals out dust and other contaminants. A groove 154 in the cover 22 receives a complementarily-shaped projection 156 on the enclosure 32 to prevent relative motion between the cover 22 and the enclosure 32. Alternatively, other locating devices such as dowels, bosses, or similar devices can be used. A gasket 158, shown in FIG. 8, can be adhered in the groove 154 to seal between the cover 22 and the enclosure 32. Over-the-center levers, elastomeric straps 160 pulled over a peg 162, or other devices can be used to secure the cover 22 to the enclosure 32. A plurality of securing devices are distributed, preferably evenly, around the container 10. These devices can be recessed to prevent inadvertent opening and damage during handling of the container 10.

The container 10 can be carried on a cart 164 for transportation to various locations where pancakes 12 are used. The cart 164 can have a surface for the container at any convenient height. This arrangement greatly simplifies the handling of pancakes. For example, with known containers, a pancake must be moved first from a slitter to a cart, then from the cart to a package in which it is packed, then, after shipping, from the package to another cart after unpacking, and from that cart to a winding or duplicating machine. Packaging and unpacking are time-consuming operations which increase the potential for damage to the pancakes as describe above. However, with the container 10, the pancake is placed from the slitter directly into the container in which it is shipped, and then from the container it is placed directly on a winding or duplicating machine. Thus, the container 10 serves as both a shipping container as well as a rack to be used during the tape handling processes and is reusable and returnable.

Additionally, because the containers are modular, the containers 10 can be loaded, four at a time, onto a pallet for shipping. The containers 10 are dimensioned to fit within the area defined by the lip of a pallet. A second set of four containers 10 can be stacked on a nesting pallet disposed on a lower first set of containers 10. A third set of four containers 10 can be stacked on a nesting pallet disposed on a lower second set of containers 10. The containers 10 can be strapped together using commercially available strapping bands, tapes, or shrink wrap.

Numerous characteristics, advantages, and embodiments of the invention have been described in detail in the foregoing description with reference to the accompanying drawings. However, the disclosure is illustrative only and the invention is not intended to be limited to the precise embodiments illustrated. Various changes and modifications may be effected therein by one skilled in the art without departing from the scope or spirit of the invention.

We claim:

1. A container for pancakes of tape, wherein each pancake includes a quantity of tape wound around a core, wherein the container comprises:
   a base;

at least one mandrel extending from the base on which a plurality of pancakes can be placed;

a cover which combines with the base to completely enclose the pancakes; and means for providing a compression load to hold the pancakes together, wherein the compression load providing means comprises a compression ring placed on the mandrel, wherein the compression ring is placed around and rotated onto the outside of the mandrel and pressed against the pancakes, and wherein the compression ring presses against substantially only the cores of the pancakes.

2. The container of claim 1 further comprising an end cap, wherein the compression ring is placed on the end cap and compresses the pancakes on the mandrel by applying a load on substantially only the outer race of the pancake cores.

3. The container of claim 1 wherein each mandrel further comprises an end cap fixed on the free end of the mandrel, wherein the end cap has an outer edge and comprises a ramped slot, a first detent, and a second detent, all formed on the outer edge, and wherein the ramped slot begins from the first detent and ends in the second detent, and wherein the compression ring has an inner surface and comprises a tab on the inner surface, wherein the tab is received within the first detent in the end cap when the compression ring is placed on the mandrel, the tab slides within the ramped slot when the compression ring is rotated onto the mandrel, and the tab is received within the second detent in the end cap to secure the compression ring in position on the mandrel.

4. The container of claim 3 wherein the compression ring is a two part assembly comprising an inner ring and an outer ring, wherein the inner ring has a cylindrical inner surface which is the compression ring inner surface and a cylindrical outer surface and comprises external threads on the outer surface, the outer ring has a cylindrical inner surface and a cylindrical outer surface and comprises internal threads on the inner surface which mate with the external threads on the inner ring to facilitate relative rotation between the two rings, wherein the tab is located on the inner ring inner surface, and wherein after the compression ring is mounted on the mandrel and the tab is received within the second detent in the end cap to secure the compression ring in position on the mandrel, the outer ring is rotated relative the inner ring to apply the pressure on the pancake cores.

5. A container for objects having a through opening comprising:
   a base;
   at least one mandrel extending from the base on which at least one object can be placed with the mandrel extending through the through opening; and
   means for providing a compression load to hold the object axially stationary on the mandrel wherein the compression load providing means is a collapsible, one-piece unit and comprises:
      at least one wing mounted on the free end of the mandrel and movable between a retracted position in which the wing is completely within the outer diameter of the mandrel and permits the object to slide onto the mandrel and an extended position in which the wing extends beyond the outer diameter of the mandrel to engage the object; and
      means for forcing the wing against the object.

6. A container for pancakes of tape, wherein each pancake includes a quantity of tape wound around a core, wherein the container comprises:
   a base;
   at least one mandrel extending from the base on which a plurality of pancakes can be placed;
   a cover which combines with the base to completely enclose the pancakes; and
   means for providing a compression load to hold the pancakes together, wherein the compression load providing means is a collapsible, one-piece unit and comprises:
      at least one wing mounted on the free end of the mandrel and movable between a retracted position in which the wing is completely within the outer diameter of the mandrel and permits pancakes to slide onto the mandrel and an extended position in which the wing extends beyond the outer diameter of the mandrel to engage the pancake cores; and
      means for forcing the wing against the pancake cores.

7. The container of claim 6 wherein the compression load providing means comprises two wings which pivot between the retracted and extended positions and the forcing means comprises an end plate mounted on the end of the mandrel adjacent the wings and a shaft passing through the end plate and into the mandrel, wherein rotation of the shaft toward the mandrel forces the end plate and the wings toward the pancakes to apply the compression load.

8. The container of claim 7 wherein the compression load providing means further comprises means for retaining the wings in either the retracted or extended positions.

9. The container of claim 6 wherein the compression load providing means comprises two wings which slide between the retracted and extended positions and the forcing means comprises a shaft passing into the mandrel, wherein rotation of the shaft away from the mandrel forces the wings toward the mandrel and the pancakes to apply the compression load.

10. The container of claim 9 wherein the shaft comprises a threaded larger diameter portion on which the wing assembly is received and a threaded smaller diameter portion which engages the end of the mandrel.

11. The container of claim 10 wherein the compression load providing means further comprises a support plate mounted on the end of the mandrel, wherein the threaded smaller diameter portion engages the support plate.

12. The container of claim 9 wherein the wings are part of a wing assembly, wherein the wing assembly further comprises a top plate and a base on which the top plate is mounted, and wherein the wings are mounted between the top plate and the base.

13. The container of claim 12 wherein the wing assembly further comprises a lock screw which is threaded into one of the wings and can engage an opening in the cores to prevent relative rotation between the wings and the cores when the compression load is applied, wherein when the lock screw engages the core the wing assembly is held adjacent the core and the wing assembly does not move away from the cores with the threaded shaft when the threaded shaft is rotated away from the mandrel.

14. The container of claim 10 wherein the wings are part of a wing assembly, wherein the wing assembly further comprises a top plate, a base on which the top plate is mounted, and a lock screw which is threaded into one of the wings and can engage an opening in the cores to prevent relative rotation between the wings and the cores when the compression load is applied, wherein the wings are mounted between the top plate and the base, and wherein as the threaded shaft is rotated away from the mandrel the wing assembly is held adjacent the core by the engagement of the lock screw in the core, the wing assembly does not move away from the mandrel with the threaded shaft while the smaller diameter portion of the threaded shaft is moving out of the mandrel for a smaller distance per rotation than the larger diameter portion thereby decreasing the distance between the wing assembly and the end of the mandrel.

15. The container of claim 12 wherein the shaft comprises a head and an L-shaped rotating bar mounted through the head of the shaft to facilitate rotation of the shaft, wherein the top plate has a slot and the short leg of the rotating bar is engagable in the top plate slot to prevent the shaft from further rotating away from the mandrel.

16. The container of claim 9 wherein the compression load providing means further comprises means for retaining the wings in either the retracted or extended positions.

17. The container of claim 9 further comprising means for moving the wings between the retracted and extended positions.

18. A container for pancakes of tape, wherein each pancake includes a quantity of tape wound around a core, wherein the container comprises:
an L-shaped base, wherein the base has a vertical portion and a horizontal portion;
at least one mandrel extending from the base on which a plurality of pancakes can be placed, wherein the mandrels are positioned substantially horizontally and extend from the vertical portion of the L; and
a cover which combines with the base to completely enclose the pancakes.

19. The container of claim 18 wherein the cover includes recesses for receiving and supporting the free ends of the mandrels.

20. The container of claim 18 wherein the base comprises an L-shaped frame and an L-shaped enclosure and wherein the enclosure has a cavity which receives the frame.

21. The container of claim 20 wherein the bottom of the L-shaped enclosure includes channels extending across and above the horizontal portion of the L-shaped frame which can receive lifting devices while preventing the container from tipping.

* * * * *